March 11, 1930.  L. J. HOIS  1,750,596
STEAMER COOKER
Filed May 23, 1927  2 Sheets-Sheet 2

INVENTOR
Louis J. Hois
BY
ATTORNEY

Patented Mar. 11, 1930

1,750,596

UNITED STATES PATENT OFFICE

LOUIS J. HOIS, OF MILWAUKEE, WISCONSIN, ASSIGNOR TO GEUDER, PAESCHKE & FREY COMPANY, OF MILWAUKEE, WISCONSIN

STEAMER COOKER

Application filed May 23, 1927. Serial No. 193,471.

This invention relates to a steamer cooker and is designed for household use.

The object of this invention is to provide a device of this character wherein various foods may be cooked by a steaming process, thereby retaining the minerals and other valuable ingredients in the food to render them not only more nutritious but also tastier, and at the same time to provide a device which is economical in the consumption of fuel and in the consumption of the water used in effecting the cooking of the food.

A further object is to provide a cooker of this character in which a number of different vegetables or other foods may be simultaneously cooked within the same steam chamber, and wherein the steam chamber is isolated from the atmosphere by a water seal, thereby greatly increasing the efficiency of the device in that the steam is retained and caused to act to best advantage on the foods, and yet, along with these advantages the device is entirely safe as the water seal precludes the accumulation of dangerous pressures.

A further object is to provide a steam cooker having these advantages and capacities and which is of simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2:
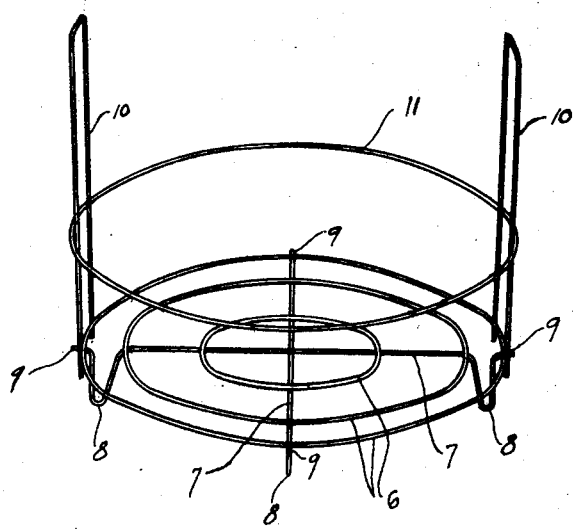
Figure 2 is a perspective view of a tray or rack.
Figure 3:
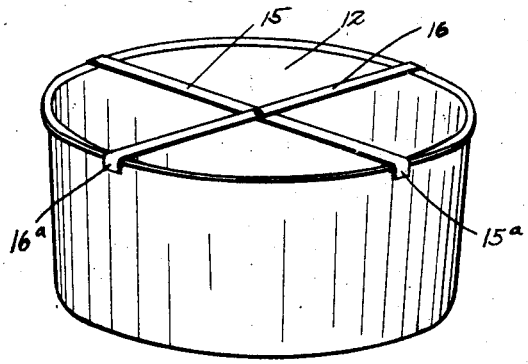
Figure 3 is a perspective view showing the lower pan for receiving foods and the support associated therewith for supporting the next upper pan.

Referring to the drawings, numeral 1 designates an outer cylindrical container having a bottom 2 and a body portion 3, the upper end of the body portion being open and formed with a rolled rim 4. Within the container 1 a tray designated generally at 5 is placed. This tray may be constructed as shown in Figure 2 and as illustrated comprises a number of concentric rings 6 constituting the base of the tray, the rings 6 being soldered or welded to cross rods 7, the latter having depending portions 8 providing feet and terminating in lateral extensions 9 for centering the tray, as will hereinafter more clearly appear. Inverted U shaped handles 10 are also included in the tray or rack structure, handles 10 being soldered or welded to the outer end of the face or rack, and also being soldered or welded to an upper ring 11.

A lower pan or receptacle 12 is provided for containing the vegetables or other foods to be cooked, this pan or receptacle 12 resting directly on the rings 6 of the tray.

With the present invention, it is entirely practical, and in fact, it is intended that several different kinds of vegetables or foods may be cooked at the same time, and in carrying out this purpose, one or more upper receptacles 13 are provided, the receptacle 13 resting on the intermediate supporting device 14, the device 14 consisting of bars 15 and 16 extending at right angles to each other and fastened together at their central portions as indicated at 17. The ends of the bars 15 and 16 are extended downwardly as indicated at 15$^a$ and 16$^a$ so as to snugly embrace the rolled rim of the lower receptacle 12.

A cover 20 is provided and has an upwardly and outwardly directed peripheral flange 21 which is engageable with the rolled rim 4 of the outer receptacle 1. This cover 20 carries a depending cylinder 22, the cylinder 22 being connected with the cover 20 by means of an intermediate inwardly curved connecting portion 23. The joint between the cylinder 22 and the cover is steam tight so that the cover and cylinder form a bell-jar adapted to be lowered into the container and supported by the flange 21 of the cover. As shown, this cylinder 22 is smaller in diameter than the cylindrical body portion 1 of the outer container, so that when the cover is applied to the outer container the inner cylinder 22 is located within the inner container in spaced relation of the inner periphery of the body portion thereof, thereby defining a space 24. The cover and the cylinder 22 together constitute a steam chamber and a means for providing a water seal, as the lower end of the cylinder 22 is open while the upper end is closed by the cover 20. As shown in the drawings, the cylinder 22 is imperforate for the major portion of its length, and around its lower end only is provided with a series of perforations or restricted openings 25. The cover 20 is likewise imperforated, although its flange 21 has a plurality of openings 26 arranged in annular series and affording a means for venting the space 24.

Figure 1:
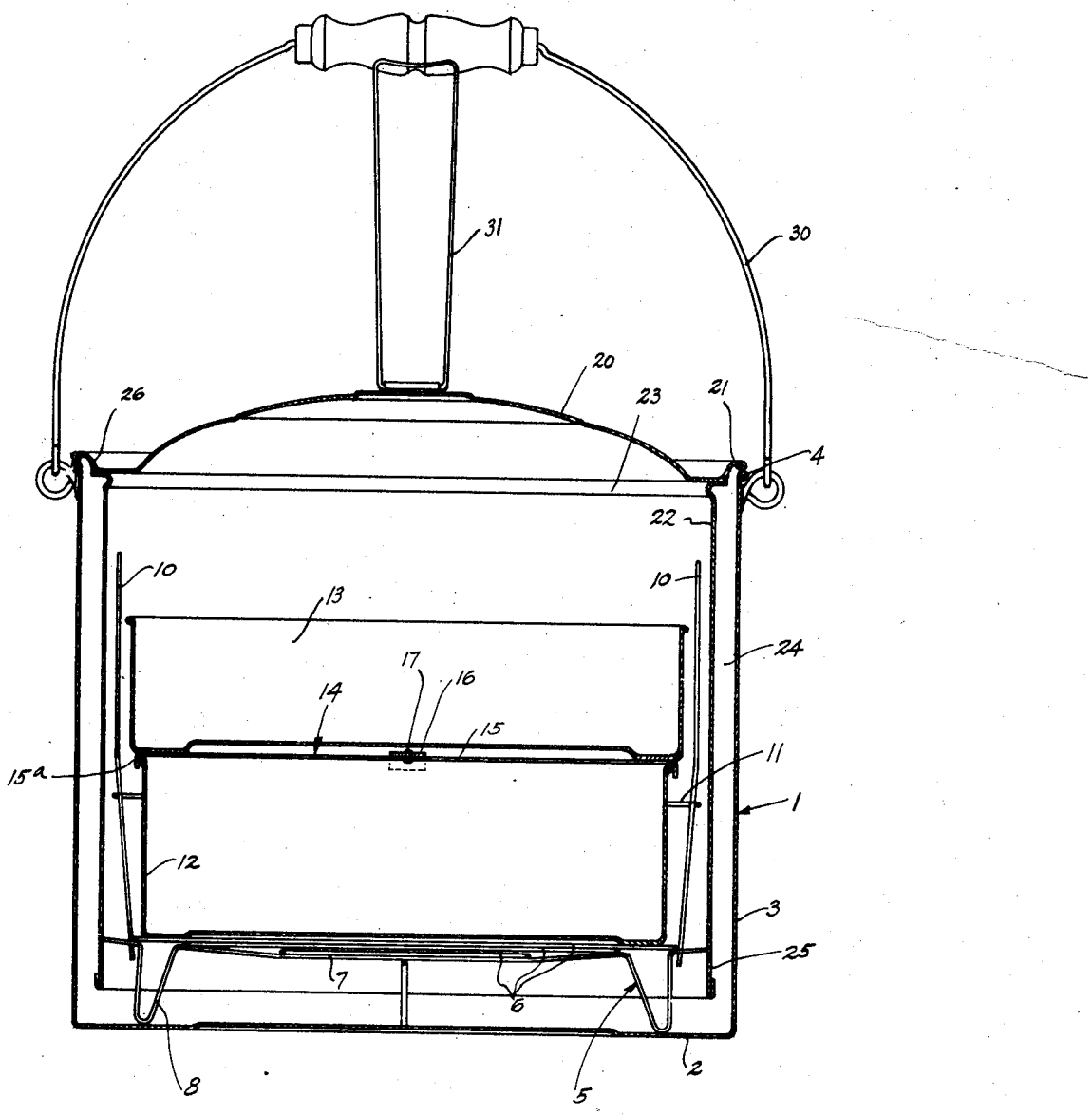
Figure 1 is a view in diametrical, vertical section showing one embodiment of the invention, parts being shown in elevation for the sake of illustration.

As shown in Figure 1, the outer container 1 has a bail like handle 30. The cover 20 has a suitable handle 31.

In using the cooker steamer, the tray 5 is first placed in the container and water is poured into the container up to the bottom of the tray. The vegetables or other foods which have been prepared as may be desirable, are then placed in the pans 12 and 13, and these pans 12 and 13 are placed within the container 1 and on the tray 5 as shown in Figure 1, the pan 12 resting on the tray and the pan 13 resting on the rack 14 supported by the pan 12. The cover and inner cylinder 22 are then placed in position. When the flange 21 of the cover rests on the rolled rim 4 of the outer container, the lower end of the cylinder 22 is submerged in the water for some extent, the water level being above the vents 25 when the cylinder 22 extends down into the container 1 as far as it may. The air trapped in the cylinder 23 displaces the water to some extent up into the space 24, thus forming a water seal. This water seal operates to retain the steam within the steam chamber defined by the cover 20 and cylinder 22, so that the steam is most effective to properly cook the vegetables or other food. The steam being thus confined operates to carry out the cooking with a minimum consumption of fuel and a minimum consumption of water. By steaming the food in this way all of its valuable ingredients are retained. Moreover, these advantages are had without dangerous pressures accumulating, for while the water seal retains the steam at a low pressure, it does not resist the escape of any high pressures should they be developed. When properly used no high pressures are developed, because but a very moderate heat is required for carrying out the cooking operation. Within the steam chamber the steam has a direct action on the foods within both of the pans 12 and 13, as these pans have open tops and as the rack 14 supports the pan 13 in spaced relation to the pan 12. If desirable, one or more additional rings 11 may be provided above the one shown for the purpose of holding the upper pan or pans in position.

While I have shown and described one specific embodiment of my invention for the purpose of illustration, it is to be understood that various changes in the size, shape and arrangement of the parts may be made without departing from the spirit of the invention or the scope of the subjoined claims.

The invention claimed is:

1. A steamer cooker comprising an outer container adapted to hold a quantity of water, a cover for the container and an inner cylinder supported by the cover and forming a steam tight bell-jar therewith, said inner cylinder projecting down into the outer container to a point adjacent the bottom of the container when the cover is placed thereon and said cylinder having restricted openings therein slightly spaced from the lower end thereof for permitting the escape of steam from the bell-jar to the space between the inner cylinder and the outer container when the pressure in the bell-jar is sufficient to lower the water level in the container to a point opposite said openings.

2. A steamer cooker comprising an outer container adapted to hold a quantity of water, a cover for the container and an inner cylinder supported by the cover and forming a steam tight bell-jar therewith, said inner cylinder projecting down into the outer container when the cover is placed thereon, said cylinder having restricted openings therein slightly spaced from the lower end thereof for permitting the escape of steam from the bell-jar to the space between the inner cylinder and the outer container when the pressure in the bell-jar is sufficient to lower the water level in the container to a point opposite said openings, and said cover having vents for permitting the escape of steam from said space.

In witness whereof, I hereto affix my signature.

LOUIS J. HOIS.